United States Patent [19]

Pollman

[11] 4,399,886
[45] Aug. 23, 1983

[54] CONTROLS FOR VARIABLE DISPLACEMENT MOTOR AND MOTORS

[75] Inventor: Frederic W. Pollman, Ames, Iowa

[73] Assignee: Sundstrand Corporation, Rockford, Ill.

[21] Appl. No.: 214,687

[22] Filed: Dec. 9, 1980

[51] Int. Cl.³ .......................................... B60K 31/00
[52] U.S. Cl. ................................... 180/197; 60/420; 60/445; 60/484; 91/473; 180/6.48; 180/76; 180/242; 180/307; 280/91
[58] Field of Search ............... 180/242, 243, 196, 197, 180/60, 247, 253, 271, 306–308, 6.48, 76; 280/91; 74/674, 785, 231; 60/399, 420, 422, 424, 427, 429, 431, 433, 436, 444, 447, 449, 451, 452, 484, 488, 494; 303/96, 98; 91/59, 473, 475

[56] References Cited

U.S. PATENT DOCUMENTS

| | | | |
|---|---|---|---|
| 2,518,578 | 8/1950 | Tomlinson | 60/447 |
| 3,177,964 | 4/1965 | Anderson | 180/307 |
| 3,199,286 | 8/1965 | Anderson | 60/420 |
| 3,256,950 | 6/1966 | DeBiasi | 180/242 |
| 3,334,702 | 8/1967 | Granryd | 180/243 |
| 3,354,978 | 11/1967 | Budzich | 180/243 |
| 3,595,334 | 7/1971 | Isaac | 180/197 |
| 3,672,161 | 6/1972 | Krusche et al. | 60/420 |
| 3,736,732 | 6/1973 | Jennings et al. | 180/243 X |
| 3,807,174 | 4/1974 | Wagenseil et al. | 60/420 |
| 3,885,388 | 5/1975 | Crull | 60/444 |
| 3,999,386 | 12/1976 | Crull et al. | 60/431 X |
| 4,040,254 | 8/1977 | Knapp et al. | 60/484 X |
| 4,076,090 | 2/1978 | Krusche et al. | 180/6.48 |
| 4,102,131 | 7/1978 | Reynolds et al. | 60/431 |
| 4,116,294 | 9/1978 | Johnston | 180/242 |
| 4,140,196 | 2/1979 | Brewer | 180/242 |
| 4,168,612 | 9/1979 | Nikolaus | 60/431 |
| 4,189,920 | 2/1980 | Dezelan | 60/420 |
| 4,197,705 | 4/1980 | Westveer | 60/445 |
| 4,241,577 | 12/1980 | Baldauf | 180/307 X |
| 4,244,184 | 1/1981 | Baldauf et al. | 180/307 X |
| 4,271,918 | 6/1981 | Molby | 180/6.48 |
| 4,295,539 | 10/1981 | Beck et al. | 180/243 |
| 4,306,467 | 12/1981 | Pollman | 74/687 |

Primary Examiner—Joseph F. Peters, Jr.
Assistant Examiner—Mitchell J. Hill
Attorney, Agent, or Firm—Wood, Dalton, Phillips, Mason & Rowe

[57] ABSTRACT

A control for a variable displacement motor which utilizes a motor speed sensitive signal for moving the displacement of the motor toward a zero displacement setting position including a device for generating a conditioned variable signal representative of motor speed, circuitry for receiving said signal and upon the signal reaching a predetermined intermediate value applying the signal to the control device for motor displacement for causing reduction in motor displacement and with various devices in the circuit for modifying the variable signal to provide a desired relation between motor speed and motor displacement. Utilization of such controls individually associated with plural variable displacement motors driving vehicle wheels and driven by one pump protects against spin-out of one of the wheels. The variable motor control is usable in a load-compensated system wherein at least one motor is associated with a drive at the front of the vehicle and another motor with the drive at the rear of the vehicle and with the control circuit having a valve responsive to the pressure condition in the system pressure lines connected between the pump and motors for differing adjustment of the displacement of the front and rear drive motors. The variable motor control is usable in a vehicle drive system with separate drives on the right and left-hand side of the vehicle to obtain steer compensation whereby the displacement of at least a pair of motors associated with the separate drives at the right and left sides of the vehicles are controlled by a circuit which includes a valve responsive to a steering signal whereby the displacement of the motors in their respective drives is varied to apply torque to the wheels in a relation to that required in connection with turning of the vehicle.

24 Claims, 10 Drawing Figures

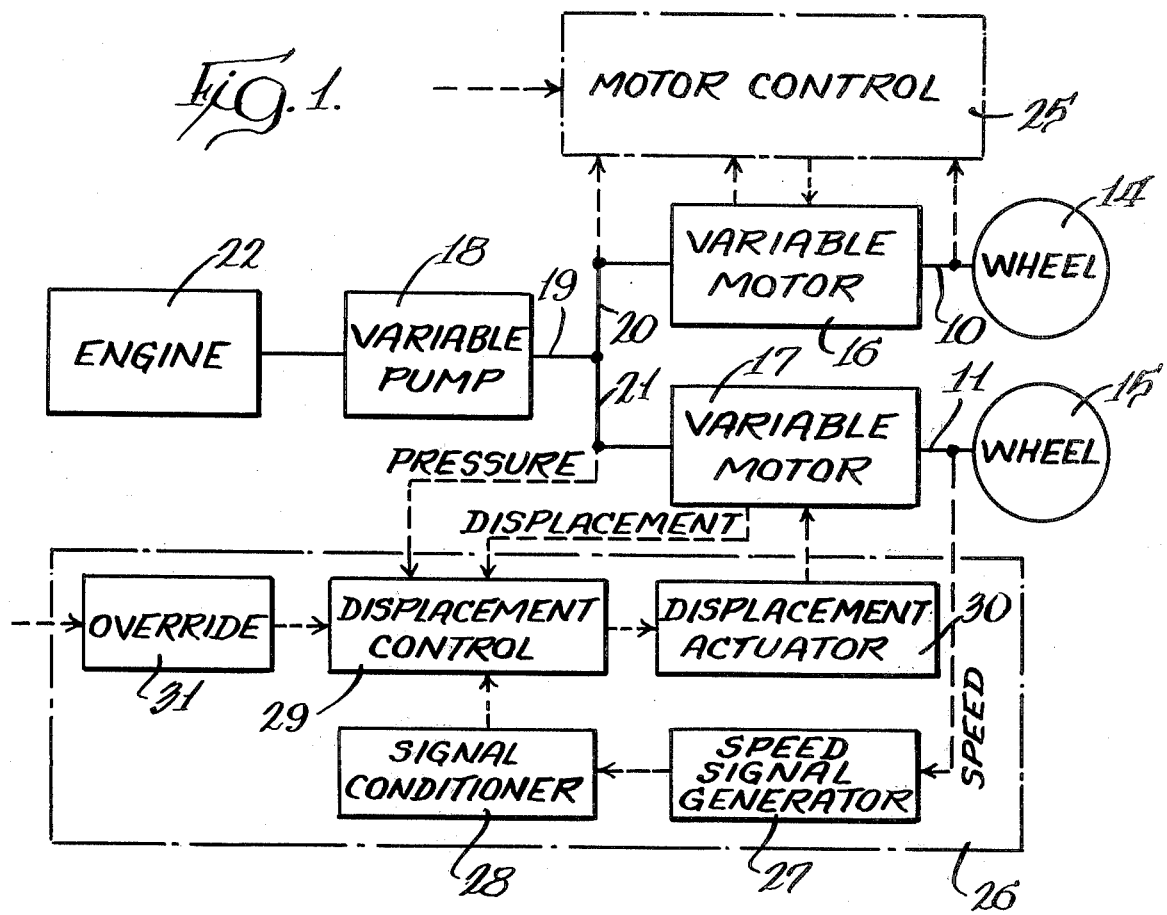
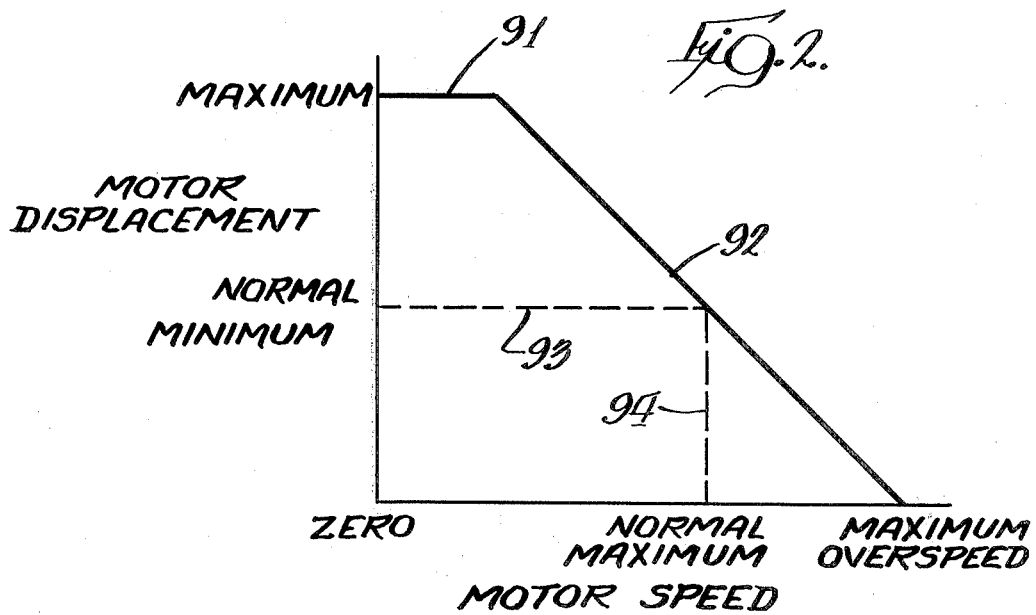

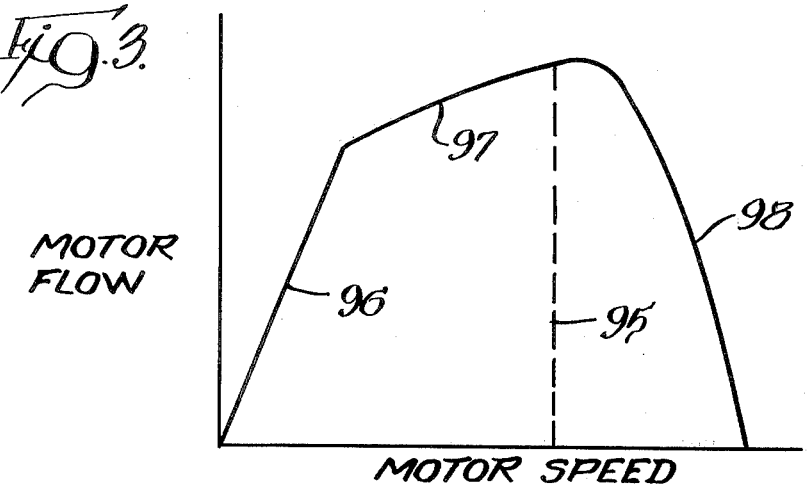
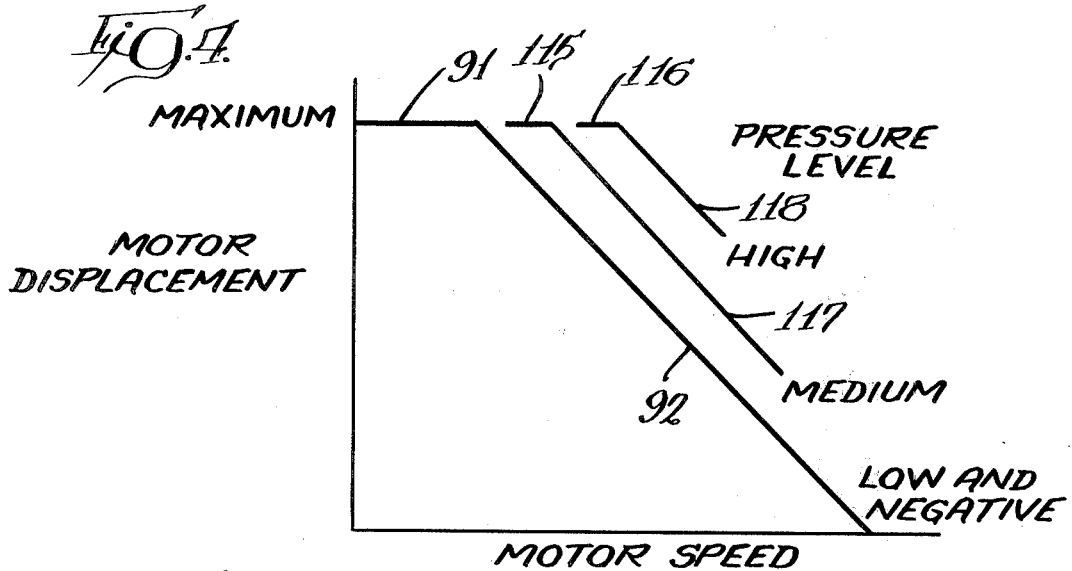
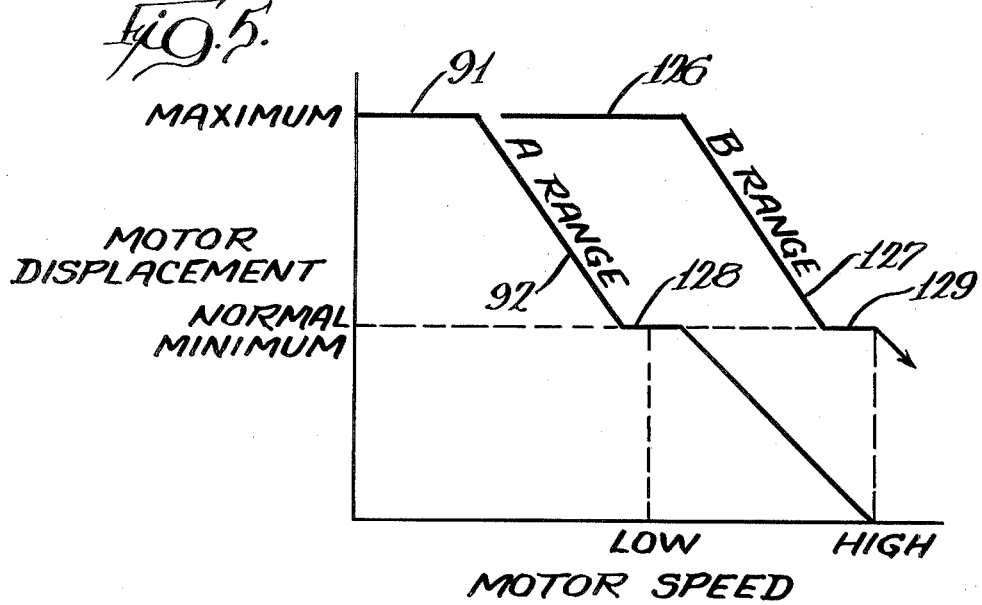

CONTROLS FOR VARIABLE DISPLACEMENT MOTOR AND MOTORS

BACKGROUND OF THE INVENTION

This invention pertains to controls for variable displacement motors utilizing a motor speed sensitive signal to vary motor displacement whereby motor displacement decreases as output speed increases and, in a normal driving range as when a motor is used in a vehicle drive, this allows vehicle speed to be controlled by the pump displacement as motor speed is a positive function of motor flow. This allows the normal pump control to function independently of the motor to achieve vehicle speed without interconnecting signal lines to the motor control.

Additionally, the invention pertains to systems using the aforesaid motor control in vehicle drives having plural motors to provide improved anti-slip control, to achieve load compensation when a load shifts due to acceleration or deceleration and allow wheel torque shift to match the vehicle weight shift due to the acceleration or deceleration and to provide for steer compensation whereby the torque applied to the wheels or other traction device at the sides of the vehicle may be varied to assist the geometry of the vehicle turn.

It is known in the prior art to utilize a motor speed sensitive signal to control the displacement of a variable displacement motor as shown in the Tomlinson U.S. Pat. No. 2,518,578. The motor control shown in said patent does not show a system wherein the motor can go to zero displacement nor does it show various ways wherein the speed signal can be varied or modified for desired operations. The Tomlinson patent discloses plural wheel drive motors driven by one pump. However, there is no disclosure of controlling slip of one of the driven wheels and the disclosed motor control does not permit moving the motor to zero displacement. The control of the patent does not limit motor flow and, therefore, cannot limit motor speed to provide good operation under wheel spin-out conditions.

In addition to the aforesaid patent, it is known to have multiple motor drive systems driven by one pump whereupon if one of the wheels has poor traction, there would be a tendency for the wheel speed and associated motor speed to increase and, in fact, overspeed. Such systems have used flow control valves in the motor line to limit flow to a slipping motor and resultingly limit motor speed.

The Anderson U.S. Pat. Nos. 3,177,964 and 3,199,286, disclose multiple motor systems driven by one pump wherein each of the motors has variable displacement. In the first patent, displacement of a motor is varied in response to the actual torque and weight forces sensed by sensing mechanism associated with the vehicle wheel and motor system. The patent describes this system as modifying the displacement of the stroke of a motor associated with a slipping vehicle wheel.

The second Anderson patent discloses plural variable displacement motors which have their displacement varied in response to system pressure whereby, as system pressure goes up, the displacement of the motors increases until a maximum displacement position is reached. This patent does not disclose any system for sensing system pressure for load-compensation or steer-compensation for the motors.

SUMMARY OF THE INVENTION

A basic feature of the invention disclosed herein resides in the control for a variable displacement motor which provides for varying motor displacement by use of a motor speed-sensitive and conditioned signal which causes motor displacement to decrease as motor speed increases. In a normal operating range of the motor, this allows the motor output speed to be controlled by the pump displacement as motor speed is a positive function of motor flow and, therefore, output speed can be controlled under normal pump control without interconnecting signal lines to the motor control. The control includes means for changing the relation between motor displacement and motor speed as well as providing different ranges of operation as when the motors are used in a vehicle drive and different ranges are desired between either road or field travel of the vehicle.

In a multiple-motor drive system driven by one pump and with each of the motors having the variable displacement control and the motor driving traction devices, such as wheels, it is possible for vehicle speed to be controlled by pump displacement. Motor speed is a positive function of motor flow and vehicle speed can be achieved by normal pump control without interconnecting signal lines to the motor control. When driving in the normal speed range, the motors would normally be at the same speed, at the same displacement angle, and at the same system pressure and, therefore, output torque and driving force would be equal at each of the wheels. If one wheel has reduced traction and starts to slip, the output speed of the motor associated with the wheel increases and its angle reduces, which lowers its output torque and reduces its tendency to slip. Since the flow to the last-mentioned motor increases, the flow to other motors decreases to cause the other motors to increase displacement and increase their torque. With the control disclosed herein, these actions tend to shift torque from the slipping drive to the nonslipping drive or drives, with resulting good anti-slip drive characteristics. In the event of a complete wheel spin-out, such as with one wheel on ice, excessive overspeed and flow loss are prevented as flow to the motor associated with the slipping wheel decreases to zero as displacement is reduced to zero with torque at the last-mentioned wheel being reduced to zero, but with flow and pressure available to the motor associated with the other wheel.

A variation of anti-slip control for variable displacement motors, as distinct from a control using self-contained logic, is a centralized motor control wherein each motor generates a speed signal with a centralized antislip control comparing the speed signals and, when one is excessive, sending a signal to the displacement control of the overspeeding motor which reduces the displacement of that motor.

Another feature of the invention is to provide a load-compensated control for plural motors in a drive system driven by one pump with there being separate motor drives at the front and rear of the vehicle wherein the variable displacement motor control which is motor speed sensitive can also operate to change transmission ratio when vehicle loading changes. This can occur upon load shift due to acceleration or deceleration or due to gravity forces when operating on a slope. If load compensation does not occur in such situations, the torque to the drive wheels will not be distributed properly resulting in wheel slip and tire wear and, in an extreme condition, wheel slip in the steer wheels for the vehicle could cause loss of steering control. With the load-compensated control disclosed herein, a normal motor displacement in response to motor speed is overridden in order to vary motor displacement in response to load changes whereby the highly-loaded motor can increase displacement to increase torque, while the lesser-loaded motor can decrease displacement to decrease torque. If desired, the load compensation can be adjusted to result in no vehicle power or speed change.

In carrying out the feature set forth in the previous paragraph, the front and rear drive motors are made responsive to system pressure of the fluid supplied to the motors whereby upon occurrence of various acceleration or deceleration conditions affecting system pressure, system pressure is applied to at least one of the motors for increasing the displacement thereof while simultaneously being applied to the other motor to decrease the displacement thereof.

Still another feature of the invention is to provide steer compensation with the control of multiple motors driven by one pump in a hydrostatic transmission wherein at least a pair of motors are associated one with each of separate drives on the right and left-hand side of a vehicle and the transmission ratio is changed when steering the vehicle. When making a turn, the torque requirement at the drive on the outside of the vehicle turn is greater than that on the inside of the turn. With the disclosed control the normal motor displacement responsive to motor speed control is overridden and the displacement of the motor responds to steering signals in order to change motor displacement and motor torque to have the torque provided the motors more nearly correspond to that required by the character of the vehicle turn. This is an improvement over systems such as drives for crawler tractors which have used a separate drive for each of the dual power paths with speed proportioning systems. As each drive must be sized to transmit power greater than half the total, the transmission must be of a greater size and such speed proportioning systems have inherent problems of matching as output speed approaches zero.

A further feature of the invention is that the steer compensating control disclosed may be operable by a steer pressure signal from a steering actuator mechanism of a vehicle, or otherwise generated, and spin turns may be accomplished causing the motor associated with the drive at one side of the vehicle to move through zero displacement to a position of opposite displacement, such as from positive displacement to negative displacement, which causes one side of the vehicle to move in a direction reverse to the direction of movement of the other side of the vehicle. Additionally, the steering function works in either the forward or reverse direction of travel of the vehicle.

BRIEF DESCRIPTION OF THE DRAWINGS

FIG. 1 is a diagrammatic view of a multiple motor drive system driven by one pump having the variable displacement motor controls associated with the motors;

FIG. 2 is a graph of motor displacement versus motor speed for the motor control disclosed herein;

FIG. 3 is a graph of motor flow versus motor speed for the motor control;

FIG. 4 is a graph showing various ranges of motor displacement versus motor speed as a result of system pressure compensation;

FIG. 5 is a graph of motor displacement versus motor speed showing different ranges in response to an override control;

DESCRIPTION OF THE PREFERRED EMBODIMENTS

Figure 7:
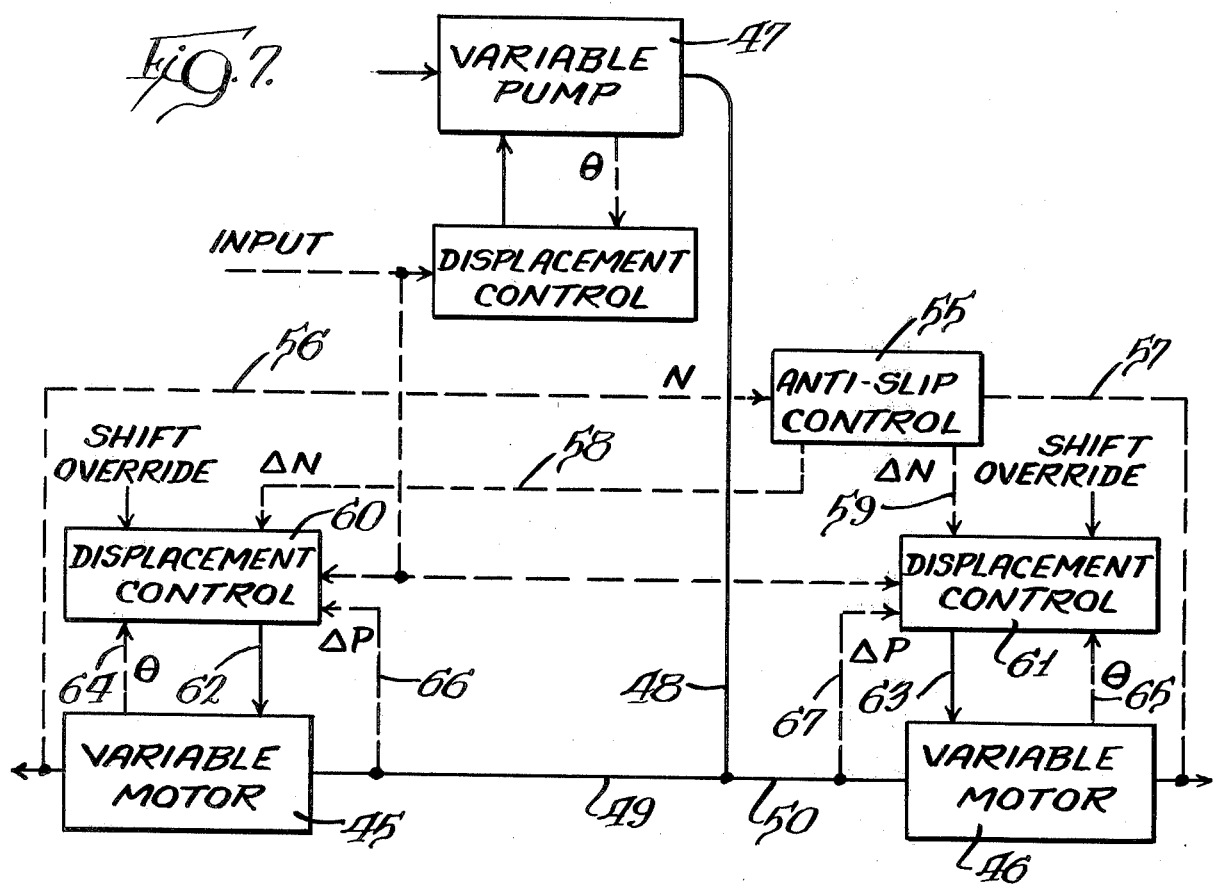
FIG. 7 is a diagrammatic view of a centralized control for a multiple motor drive system driven by one pump providing anti-slip control.
Figure 8:
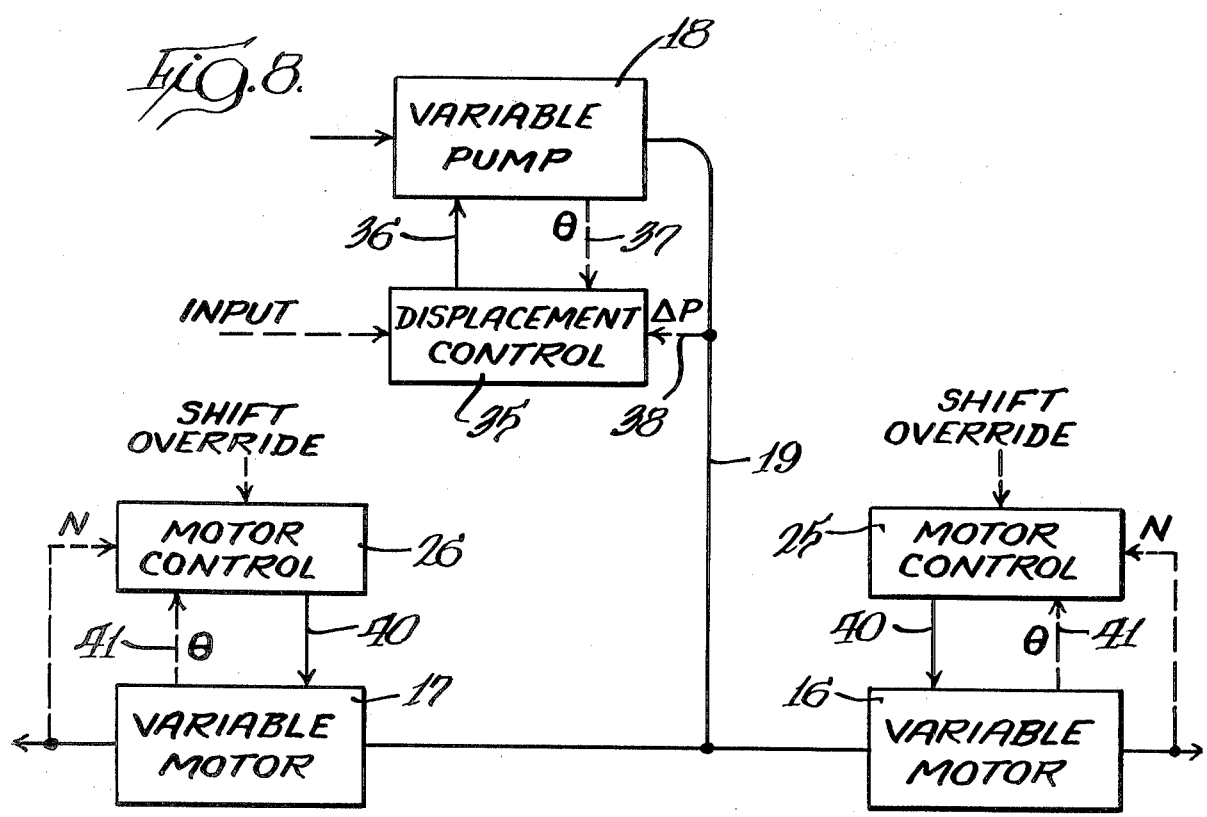
FIG. 8 is a diagrammatic view of a self-contained motor control with anti-slip control and which generally corresponds to the diagrammatic view of FIG. 1.

Two types or systems of variable displacement motor anti-slip control are disclosed in FIGS. 1, 7 and 8. In both systems, two or more variable displacement motors are connected in parallel in circuit with a variable displacement pump and with there being a control of the displacement of the motors to reduce the displacement of one or the other of the motors as the speed thereof increases.

A self-contained motor control, as for plural vehicle wheels, is shown in the block diagrams of FIGS. 1 and 8 and discloses a proportional anti-slip control wherein the speed of each motor is proportional to the displacement of the motor. In this control, the motor torque decreases as the speed increases and wheel traction is optimized under a condition where one wheel is slipping.

Referring to FIG. 1, a pair of drive shafts, such as axles 10 and 11 for the wheels 14 and 15, are driven by a pair of variable displacement motors 16 and 17, respectively. These motors are in fluid circuit in parallel with a variable displacement pump 18 by means of fluid lines, indicated diagrammatically at 19, 20 and 21. In a hydrostatic transmission, the pump and motors are in closed circuit whereby, during operation, there is flow in both directions between the pump and the motors. The variable displacement pump 18 is shown as being driven by a prime mover, such as an engine 22.

Each of the motors has a motor control associated therewith which may be electric or hydraulic and with an hydraulic form of the control disclosed in FIG. 6 which will be described subsequently. The motor 16 has the motor control 25 and the motor 17 has the motor control 26 with the components of the latter motor control being specifically identified and with there being similar components (not shown) for the motor control 25. The motor control includes a speed signal generator 27 which generates a variable signal indicative of motor speed, with an example of such being a pump driven by the drive shaft 11. The speed signal is delivered to a signal conditioner 28 to establish a desired relation between motor speed and motor displacement for affecting motor displacement as motor speed changes. The conditioned signal is delivered to a displacement control 29 which controls the application of the signal to a displacement actuator 30 for the variable displacement motor and which receives a displacement feedback signal from the motor 17. The displacement control 29 can receive additional modifying signals including an optional override signal provided by an override unit 31 which provides two different relations between motor speed and motor displacement. Additionally, an optional pressure signal can be delivered from the system line 21 to affect motor displacement and adjust available output torque if the load on the motor 17 increases.

In the block diagram of FIG. 8, the control of the variable displacement pump 18 is shown more particularly and includes a displacement control 35 which is operable by an indicated input and has an output through a line 36 for control of displacement of the pump. A feedback signal $\phi$ representing the displacement of the pump is fed back to the displacement control through a line 37. The system pressure existing in the line 19 extending between the pump and motors is supplied to the displacement control, as indicated at 38, to function as a pressure limiter control on the pump.

The control of the variable displacement motors 16 and 17 in FIG. 8 is generally the same as described in connection with FIG. 1, with the speed signals N delivered to the motor controls. Each of the motor controls has the indicated shift override capability, a displacement-setting output through a connection 40, and a displacement feedback signal $\phi$ through a connection 41.

A different type of anti-slip control is shown in the block diagram of FIG. 7 which is a centralized control. A pair of variable displacement motors 45 and 46 are in circuit with a variable displacement pump 47 by means of fluid lines indicated diagrammatically at 48, 49 and 50 and which, as pointed out previously, can represent lines which connect the pump and motor into hydrostatic transmission wherein there is a closed circuit between the pump and motors. Each of the motors has means associated therewith for generating a speed signal N which is delivered to an anti-slip control 55 by signal lines indicated at 56 and 57. The anti-slip control compares the speed signals and when one is excessive sends a signal to the displacement control of the overspeeding motor which reduces the displacement of that motor. The speed signal generated by the anti-slip control is represented by $\Delta N$ supplied to one or the other of the signal lines 58 and 59 which extend to the displacement controls 60 and 61 for the respective motors 45 and 46.

The displacement controls 60 and 61 have an output represented by respective lines 62 and 63 for setting the displacement of the motor and with each having feedback $\phi$ connection indicated at 64 and 65, respectively. In the centralized motor control, there is parallel ratio and anti-slip limit control with pressure override provided by a system pressure signal from the system pressure lines 49 and 50, respectively, to either of the displacement controls 60 and 61 through the signal lines 66 and 67. This anti-slip control operates to limit the difference in speed between the wheels driven by the respective motors as well as maximum speed and percent slip. The pull ratio of the drive wheels in the worst traction is limited by the slip of the best.

Figure 6:
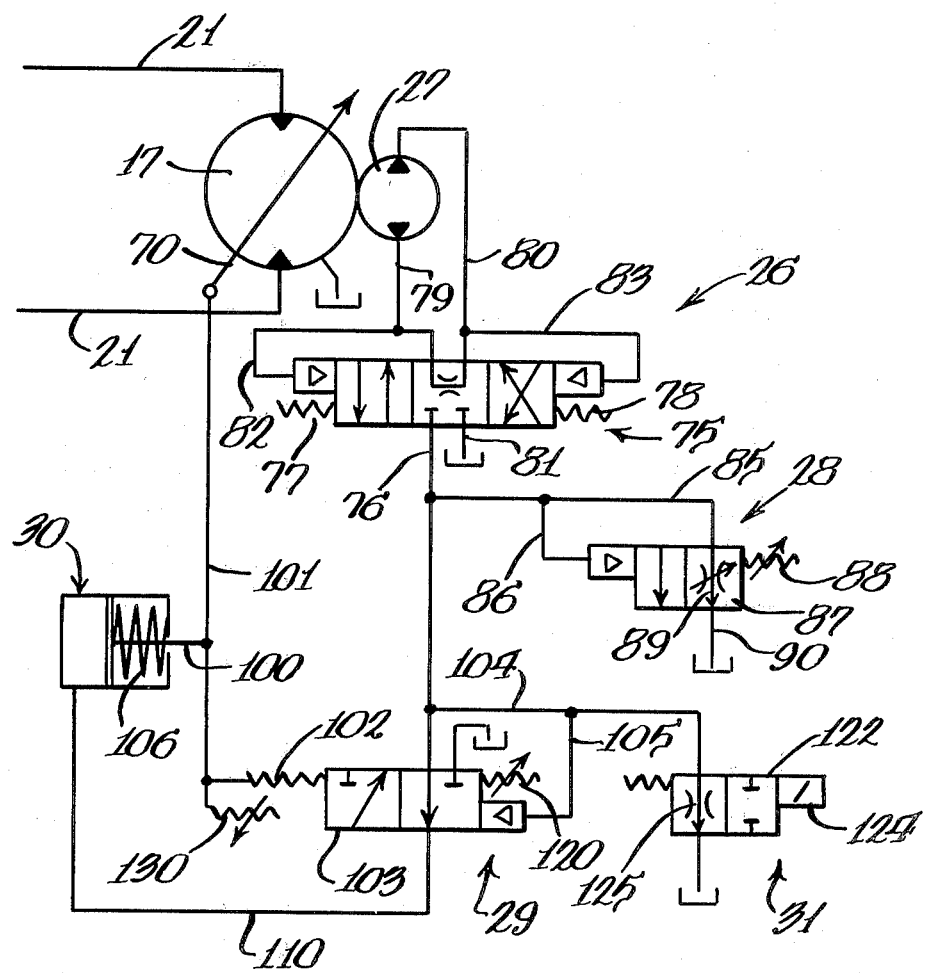
FIG. 6 is a schematic drawing of a hydraulic form of the variable displacement motor control.

A control for a variable displacement motor as represented by the block diagram of FIG. 1 is shown in FIG. 6. The components shown in FIG. 6 are generally identified by the same reference numerals as used in the block diagram of FIG. 1 and with the control being shown in association with the motor 17. The variable displacement motor 17 may be of the axial piston type which, as shown schematically, has a movable displacement-setting member in the form of a swash plate 70 which can be positioned to control the displacement of the motor by establishing the stroke of a plurality of axially movable pistons. The swash plate is movable between a position wherein there is zero displacement and a position of maximum displacement, approximately as shown in FIG. 6.

The speed signal generator 27 is a fixed displacement pump connected to the motor for rotation therewith. This pump provides an output flow proportional to output speed of the motor 17. A switching valve, indicated generally at 75, is connected in circuit with the speed pump 27 and operates to allow output flow from the speed pump 27 to be positive in the sense that it flows to a signal line 76 regardless of whether motor speed is positive or negative and direction of rotation of the speed pump. Switching valve 75 is spring-centered by springs 77 and 78 to the neutral position shown wherein flow lines 79 and 80 to the speed pump are in communication with each other and the signal line 76 and a tank line 77 are blocked. With rotation of the speed pump 27, one or the other of the lines 79 and 80 has a build-up in pressure which, through respective branch lines 82 and 83, causes shift of the switching valve to one or the other of the operative positions shown whereby the positive flow is directed to the signal line 76 and the tank line 81 supplies fluid to the speed pump circuit.

The signal conditioner 28 is a valve having an input line 85 connected to the signal line 76, with a branch pilot line 86 operable to urge the valve member 87 of the signal conditioner valve to move in a direction against the action of a variable preload spring 88. The valve member 87 has an orifice 89 which is variable in response to the pressure existing in branch line 86 to control flow to a tank line 90. The function of the signal conditioner 28 is to enable alteration of the characteristic of the speed signal from the speed pump 27 to provide the desired control relation between motor speed and motor displacement and with such a relation shown in the graph of FIG. 2. From zero motor speed up to a certain value thereof, the motor remains at maximum displacement, as indicated by the horizontal line 91 in FIG. 2, and thereafter, as motor speed increases, motor displacement decreases, as indicated by the line 92, until at maximum overspeed of the motor, the motor displacement is zero. The broken lines 93 and 94 indicate a normal minimum displacement and maximum speed for the motor, respectively.

The graph of FIG. 3 shows the relation between motor speed and motor flow and with the vertical broken line 95 indicating normal maximum motor speed corresponding to the broken line 94 in FIG. 2. As motor flow builds up from zero, motor speed increases at a certain rate, indicated by the line 96, with a greater rate of increase indicated by the line 97. At a point beyond the normal maximum motor speed, the motor flow drops off, as indicated by the line 98 and drops to zero as the motor reaches zero displacement. The speed signal in line 76, as conditioned by the signal conditioner 28, is therefore variable, dependent upon the speed of the pump, and is delivered to the displacement control 29 and used as a signal for positioning the valve of the displacement control, as well as the supply therefor. The displacement control valve controls the delivery of fluid to a displacement actuator 30, which is a control device and in the hydraulic embodiment is a cylinder having a piston rod 100 connected to a link 101 which is pivotally connected to the swash plate 70. The link 101, through a spring 102, functions as a feedback linkage to the valve member 103 of the displacement control valve. The speed signal is applied to the displacement control valve member 103 for positioning thereof through a branch line 104 and a pilot line 105 to act against the force of the spring 102. When the speed signal reaches a predetermined pressure value, the valve member 103 moves to the position shown whereby the speed signal can be applied to the cylinder of the control device and act against a spring 106 therein as well as pressure-sensitive moments from the swash plate 70. Prior to the predetermined value of the speed signal, the valve member 103 is in a position wherein the signal cannot reach the line 110 leading to the control device cylinder and the swash plate 70 is at maximum displacement-setting position as represented by the line 91 in the graph of FIG. 2. Once the displacement control valve member shifts to permit passage of the pressure signal to the control device cylinder and the force of spring 106 as well as pressure-sensitive moments on the swash plate are overcome, the displacement of the motor decreases, as indicated by the line 92 in FIG. 2 and, at maximum overspeed of the motor as represented by maximum value of the speed signal, the motor displacement goes to zero. For practical purposes, the result to be acheived is zero outut torque where a motor shaft will not speed up and which can occur at some small displacement greater than zero.

As shown in FIG. 1, an optional pressure signal from the pressure line between the variable displacement pump and the variable displacement motor may be applied to the displacement control valve 103 in order to adjust the relation between motor displacement and motor speed. This is evidenced by the graph of FIG. 4 which shows the lines 91 and 92 which are the same as in the graph of FIG. 2 which are representative of the control when system pressure is low or negative. The motor is retained at maximum displacement, as represented by lines 115 and 116, for greater values of motor speed when system pressure is either medium or high, respectively, and with sloped lines similar to line 92 and indicated at 117 and 118 which represent decrease in motor displacement as motor speed increases further.

A spring 120 is a variable spring in order to provide a final adjustment in the operation of the displacement control valve. The override 31 is embodied in a valve having a valve member 122 which is spring-urged to the position shown in FIG. 6 and which is selectively operable to establish a second motor-displacement/motor-speed range relationship. This is accomplished by modifying the speed signal to have a different signal versus motor speed relationship. The two ranges of operation enable the change of effective ratio of a motor, such as in a vehicle drive system, to provide for different vehicle operations such as roading or field work and with the two ranges being shown in the graph of FIG. 5. The A range is comparable to the range shown in FIG. 2, with the reference numerals 91 and 92 generally identifying the lines corresponding to those shown in FIG. 2, and occurs when the override valve member 122 is shifted from the position shown to a position in which the branch line 104 is blocked as by operation of a solenoid 124. With the override valve member 122 positioned to have flow through an orifice 125, the range is illustrated by a line 126, indicating the greater extent of the operation of the motor at maximum displacement with increasing motor speed and the line 127, showing the decrease in displacement down to a normal minimum displacement, and with displacement reaching zero at higher speeds. The lines 92 and 127 have dwells shown by lines 128 and 129, respectively. These dwells are provided by pre-load means in form of a spring 130 which has a preload and is only operative after a certain range of movement of the displacement control valve member 103. The increased value of the speed signal in line 76 is not operative to further open the valve member 103 until the preload on spring 130 is overcome, with the result that motor displacement dwells even though motor speed increases and, therefore, the value of the speed signal increases.

The circuit of FIG. 6 represents a hydraulic embodiment of a system wherein a motor speed-sensitive signal provides for the control of ratio with self-contained logic and with an operator-controlled override which can change the effective ratio of the motor. The basic control functions to decrease motor displacement as output speed increases. In the normal driving range of a vehicle using such a system, this allows vehicle speed to be controlled by the pump displacement as motor speed is a positive function of motor flow as illustrated by the graph of FIG. 3. This is desirable as it allows the normal pump control to function independently of the motor to achieve vehicle function without interconnecting signal lines to the motor control.

Good anti-slip characteristics are also achieved. When driving a vehicle in the normal speed range and with equal wheel loading two or more wheel driving motors would normally be at the same speed and at the same displacement angle. Because the motors are also at the same pressure, output torque would be equal and driving force would be equal. If one wheel has reduced traction and starts to slip, its output speed increases and the angle of its swash plate reduces for reduced motor displacement, as shown in the graph of FIG. 2, which lowers output torque and reduces tendency to slip. Also, because motor flow increases to the last-mentioned motor, the flow to the other motor in the system, as illustrated in FIG. 1, decreases, with decrease in motor speed as shown in the graph of FIG. 3. This causes said other motor to increase displacement and increase its torque with the result that these actions combine to shift torque from the slipping drive to the non-slipping drive with resulting good anti-slip drive characteristics. In the event of a complete wheel spin-out, such as with one wheel on ice, excessive overspeed and flow loss are prevented as flow to the motor decreases as displacement is reduced beyond the normal working range and at maximum overspeed there is zero motor displacement and, therefore, no flow through the motor, which avoids flow loss. The torque at the wheel with no traction is reduced to zero but flow and pressure are available to the motor driving the other wheel.

Referring again to FIG. 6, as the speed of the motor 17 increases the signal generated by the speed pump 27 increases. When the preload in spring 102 is exceeded, flow to the cylinder for the swash plate is allowed and motor displacement decreases until the force of the spring 102 because of feedback equals the value of the pressure signal from the speed pump. Displacement is regulated according to the speed signal.

If pressure compensation is desired, the speed signal and the spring 106 within the control device cylinder are sized to allow the swash plate 70 to increase in angle as working pressure in the pump-motor system increases. However, the displacement control valve member 103 will not allow the motor 17 to decrease displacement below the minimum programmed into it.

The switching valve 75 can be altered with changed porting and orifice to drain to allow a different signal characteristic from forward to reverse motor rotation.

Figure 9:
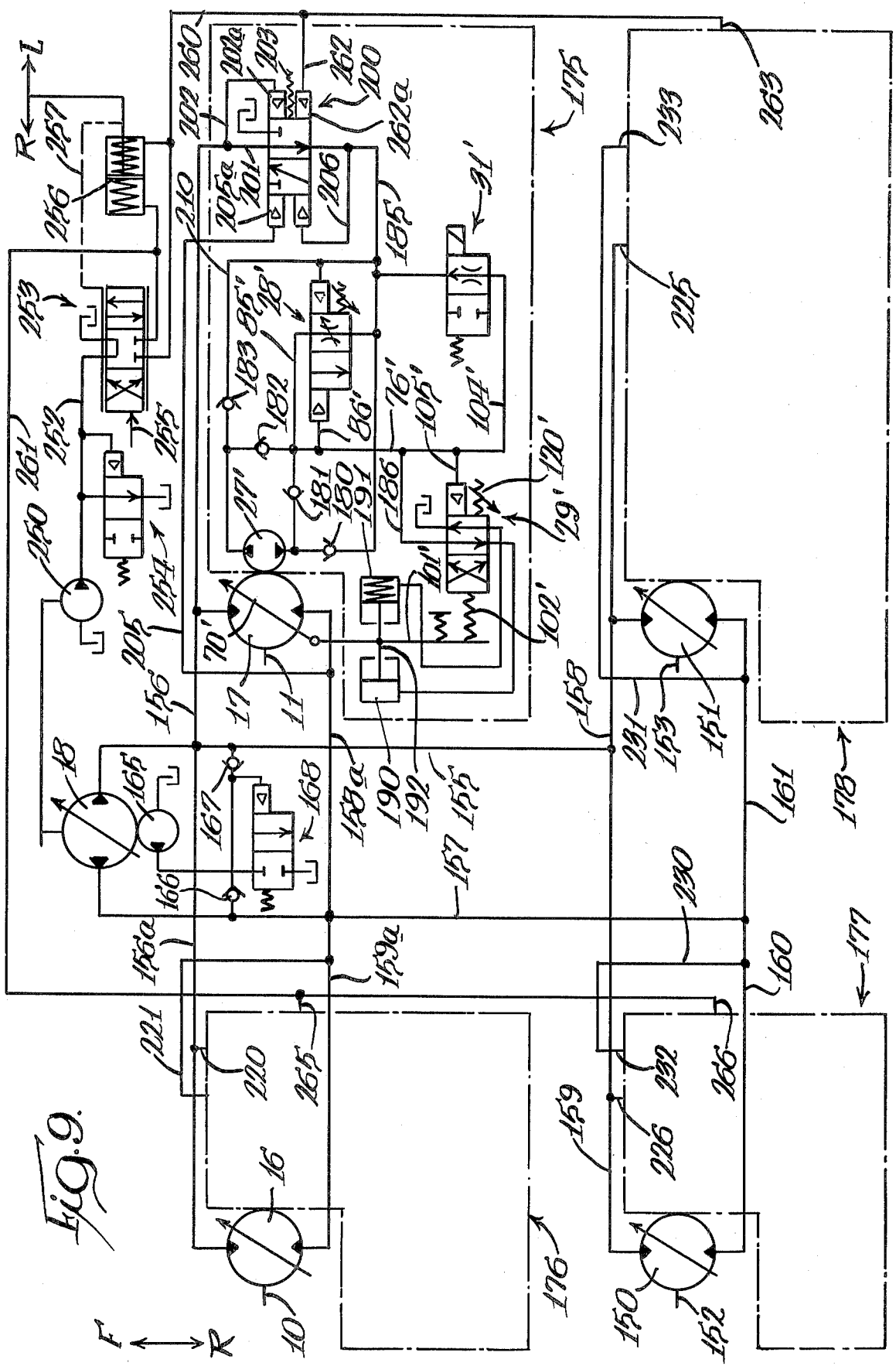
FIG. 9 is a schematic drawing of the load-compensated variable motor control.

Utilization of the control for a variable displacement motor with load compensation is shown in FIG. 9 wherein the motors 16 and 17 correspond to the motors referred to in FIG. 1 and constitute front drive motors for a pair of front wheels of a vehicle. An additional pair of motors 150 and 151 constitute rear drive motors for driving a pair of shafts 152 and 153, respectively, each of which have a rear wheel (not shown). An F-R legend is used in the figure identifying a direction of forward travel by F and the direction of reverse travel by R. The motors 16, 17, 150 and 151 are in a closed fluid system with the pump 18 including a system line 155 which, by front motor branch lines 156 and 156a and by rear motor branch lines 158 and 159, supplies fluid under pressure to the motors in a forward direction of travel of the vehicle and in which a relatively higher pressure exists upon either forward acceleration or reverse deceleration of the vehicle. A second system line 157 is connected by front motor branch lines 158a and 159a to the front drive motors and by rear branch lines 160 and 161 to the rear drive motors and with this line being under system pressure when the vehicle is traveling in a reverse direction and under a relatively higher pressure when the vehicle has reverse acceleration or forward deceleration.

In a hydrostatic transmission as represented by the disclosed fluid system, a charge pump 165 connected to a source of fluid can supply make-up fluid to either one of the system lines 155 or 157, which is at the lower pressure through one of a pair of check valves 166 and 167 and with the charge pressure supplied by the charge pump being limited by a pressure relief valve, indicated generally at 168. A motor control for the front drive motor 17 is identified generally at 175 and is shown in detail while similar controls for motors 16, 150 and 151 are generally identified at 176, 177, and 178 and with these motor controls being identified only by outline and with the components thereof being the same as those described in detail in connection with motor control 175.

The motor control 175 has basic components as described previously in connection with FIGS. 1 and 6, and with the same components as shown in FIG. 6 being given the same reference numeral, with a prime affixed thereto. The speed pump 27', driven by the front drive motor 17, outputs a motor-speed sensitive fluid signal to the signal line 76' and with reversible operation permitted by the use of four check valves 180–183 which operate similarly to the switching valve 75 of FIG. 6 to always direct a positive pressure to the signal line 76' and control the application thereof to pilot line 86' for the signal conditioning valve 28'. The variable signal representative of motor speed is directed by a branch line 104' to the selectively-operable override valve 31' which outputs to a line 185 which is connected to circuit components to be described. The motor-speed sensitive signal is applied to the displacement control valve 29 as a pilot signal through the line 105' and also delivered thereto as a source of operating fluid through the line 186. The displacement control valve 29' controls the delivery of fluid to a servo control device for the motor swash plate 70' and, more particularly, to either of a pair of cylinders 190 and 191 which, by a link 192 extending between the pistons thereof, is connected to an operating link 101' which connects to the motor swash plate.

With the structure as thus described, it will be seen that the motor-speed sensitive signal is conditioned as described in connection with FIG. 6 and then is applied to the displacement control for control of motor displacement and with an optional override provided by the override valve 31'.

The motor-speed sensitive signal is subject to modification in the circuit of FIG. 9 to provide for load compensation in order to change transmission ratio when system loading changes. This can occur when the load shifts to acceleration or deceleration or due to gravity forces when operating on a slope. If load compensation does not occur under these conditions, the torque may not be distributed properly to the various drive motors, resulting in wheel slip and tire wear. In the extreme, wheel slip in the front drive wheels when used as steering wheels can cause loss of steering control. The circuit of FIG. 9 provides for overriding the normal motor displacement control in response to motor speed in order to vary motor displacement in response to load changes. In a multiple motor system as shown, the highly loaded motor can increase displacement while the less loaded motor decreases displacement. The compensation can be adjusted to result in no vehicle power or speed change and the direction of compensation changes when the direction of load shift changes.

The load compensation includes the utilization of a pressure regulator valve with each of the motor controls. As shown for the motor control 175, the pressure regulator valve 200 has an input line 201 connected to the front motor branch line 156 whereby the input of the pressure regulator is supplied from the system line 155. System pressure in that system line is also applied to the valve member of the pressure regulator valve through a pilot line 202 to pilot 202a to urge the valve member to a position whereby flow through the pressure regulator valve is directed to the line 185 previously referred to. In addition to system pressure in system line 155 urging the valve 200 to the position shown, there is a spring 203 acting to urge the valve member in the same direction. A pilot line 205 extends from the front motor branch line 158a whereby system pressure in system line 157 can be applied to a pilot 205a of the valve 200 to urge the valve member toward the right from the position shown and toward a position wherein the line 185 is connected to tank and the input line 201 is blocked. Additionally acting on the valve member in the same direction, is the output from the valve acting through a pilot line 206.

The motor control 175 differs from that shown in FIG. 6 in that the supply of the speed pump 27' is not from a source of fluid, such as a tank, but is from the output of the pressure regulator valve 200 through the line 185 by flow through either the check valve 180 or through a line 210 and the check valve 183. This results in the signal actually applied to the servo control cylinder 190 being a summation of the output from the pressure regulator valve 200 and the speed pump 27'. The pressure regulator valve 200 acts as a signal-modifying means to modify the signal otherwise provided by the speed pump 27'. The summing of the two outputs renders the displacement of the motor 17 subject to both motor speed with an overriding control from system pressure in one or the other of the system lines 155 and 157. It will be noted that the signal conditioner valve 28' is also piloted in response to pressure in the line 210 which extends from the line 185 to the speed pump.

If the pressure in system pressure line 155 increases, the pressure in line 201 increases and applied to the pilot 202a urges the valve in a direction to increase the output signal from the pressure regulator valve which is then supplied to the input of the speed pump and resultingly modified by the speed of the speed pump. When the signal from the pressure regulator valve increases, the effect is to cause a decrease in the displacement of the motor 17 which decreases the torque output of the motor.

If pressure increases in system pressure line 157, this increase is applied to the pilot section 205a of the pressure regulator valve through the lines 158a and 205 to urge the pressure regulator valve in the opposite direction to reduce the value of the output signal from the regulator valve, with resultant increase of motor displacement and increase of torque at the motor 17.

The connections to the motor control 176 for the front drive motor 16 are the same as for the front drive motor 17, with the branch system line 156a connecting into the pressure regulator valve thereof by a line 220 corresponding to the line 201 of the motor control 175 which, thus, also supplies the pilot line corresponding to pilot line 202. A line 221 from the system branch line 159a feeds into the motor control in a manner corresponding to the line 205 of motor control 175 for delivering a pilot signal which urges the pressure regulator valve towards closed position.

The motor controls 177 and 178 also have the same components as the motor control 175 but with the connections to the pressure regulator valves of the motor controls with respect to the system lines being reversed. The system branch lines 158 and 159 have line sections 225 and 226 making connections to the pressure regulator valves corresponding to the line 205 of the motor control 175 whereby pressure in these branch lines acts to urge the pressure regulator valves toward the closed position. The system branch lines 160 and 161 each have the respective lines 230 and 231 extending therefrom which extend to the pressure regulator valves and make connections thereto, as indicated at 232 and 233, respectively, corresponding to a line 201 and the pilot line 202 of motor control 175, whereby occurrence of pressure in the system line 157 acts to urge the pressure regulator valves toward open position.

In the load-compensated variable motor control, high pressure in system line 155 corresponds to forward acceleration or reverse deceleration and high pressure in system line 157 corresponds to reverse acceleration or forward deceleration. With the system line 155 connected to lines 201 and 220 leading to the pressure regulator valves of the motor controls 175 and 176, an increase in pressure in system line 155 resulting from forward acceleration moves the pressure regulator valves to a more open position for increase in the signal applied to the displacement control for the front motors to decrease the displacement of the motors. The increase in pressure in system line 155 is applied to lines 225 and 226 of the motor controls for the rear drive motors which acts on the pressure regulating valves thereof to move the valves more nearly toward a closed position for reducing the output signal therefrom which results in increasing the displacement of the rear drive motors. This allows a wheel torque shift for higher torque at the rear wheels to match the vehicle weight shift due to the forward acceleration. Overall vehicle power may remain unchanged as the displacement increases can offset the decreases. In like manner, output torque is adjusted for the other three possible load shift cases, such as reverse deceleration, reverse acceleration and forward deceleration. There is a higher pressure in system line 155 on forward acceleration or reverse deceleration and a higher pressure in system line 157 on reverse acceleration or forward deceleration.

Figure 10:
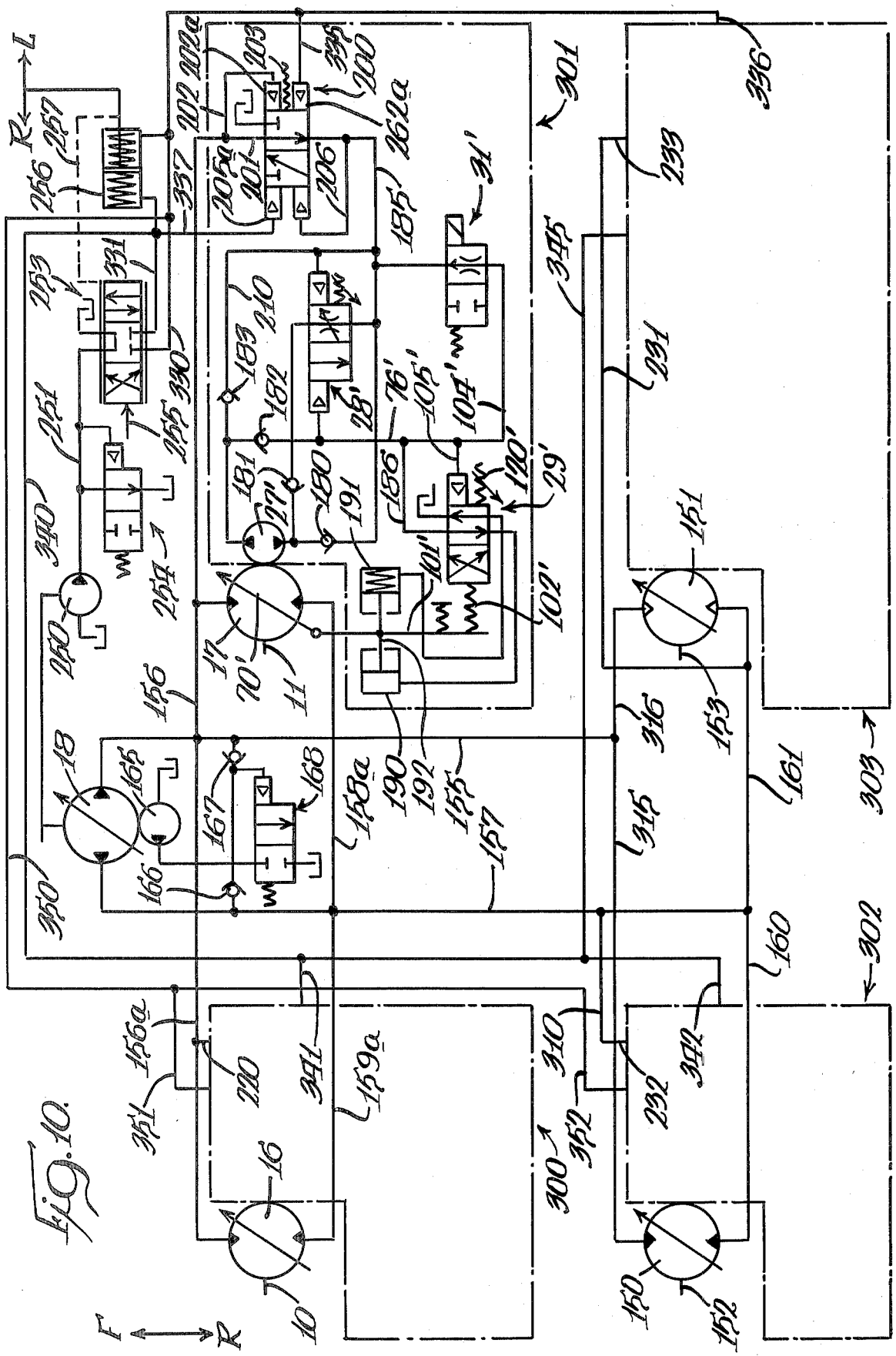
FIG. 10 is a schematic drawing of the steer-compensated variable motor control.

A steering control is shown in FIG. 9 and described generally, with a more detailed description of similar components given in connection with the steering control embodiment of FIG. 10. The steering control of FIG. 9 includes a pump 250 driven by the same input as pump 18 and which supplies fluid through a line 252 to a steering control valve, indicated generally at 253, and with the pressure in line 252 being subject to a maximum limit by a relief valve, indicated generally at 254. A steering handle 255 operates the steering valve 253 for controlling the direct steering of the front wheels of the vehicle by means of actuator 256 and, through a linkage 257, feedsback position to the valve member of the steering control valve 253. The symbols R and L indicate the direction of turn in response to actuator movement. The steering control valve can either be in the neutral position shown wherein the pump output is connected to tank, or in modulating positions wherein fluid under pressure is delivered to either a line 260 or a line 261. The line 260, in addition to connecting to one side of the steering actuator 256, extends to pilot lines 262 and 263 which act on pilot sections 262a of the pressure regulator valves of the motors controls 175 and 178 to urge the valves toward open position. The line 261, in addition to having a connection to the steering actuator 256, also extends to pilot lines 265 and 266 which act on pilot sections 262a of the pressure regulator valves of motor controls 176 and 177 to urge the valves toward open position.

As a right turn is made, the pressure is caused to increase in the line 260 to shift the pressure regulator valves in the motor controls for the wheels at the right of the vehicle to decrease the displacement of the motors 17 and 151 to reduce the torque at the wheels at the right side of the vehicle which assists the geometry established by the vehicle steering mechanism. When a steer in the opposite direction is required, the pressure increases in the line 261 which acts on the pressure regulators of the motor controls 176 and 177 to reduce the displacement of the motors 16 and 150 to reduce torque at the associated wheels.

For vehicles requiring load-compensation torque adjustment only for downhill steering control, the signal connections from system line 155 to the rear motors 150 and 151 may be omitted and the signal connections from system line 157 to the front motors 16 and 17 may be omitted.

For systems with as few as one motor, such as motor 17 connected to pump 18, the control can compensate for a speed droop caused by pressure changes. For example, if there is an increased leak in the system caused by higher system pressure this will reduce the flow of fluid through the system branch line 156 to motor 17. Pressure in the supply line 201 for the pressure regulator and branch line 202 increases also whereby the magnitude of the output signal from the pressure regulator is increased to increase the total signal applied to the displacement control for the motor. This provides for a small amount of change in motor displacement to compensate for leakage effects and which is of a magnitude much less than motor displacement variation in response to motor speed.

With the system shown in FIG. 9, the flow through the pressure regulator valves of the motor controls establishes a minimum pressure to drive the control servos for the motor displacement controls with the speed signal from the speed pump of each control being additive thereto.

FIG. 10 shows a steer-compensated control for use in a plural variable displacement motor system for vehicle drive and with the general organization of structure being similar to that shown in the embodiment of FIG. 9 and with basic components which are the same as those described in FIG. 9 being given the same reference numeral.

Each of the motors 16, 17, 150 and 151 has a motor control associated therewith and identified generally at 300, 301, 302 and 303, with the motor control 301 being associated with the variable displacement motor 17 and being shown in detail. The remaining motor controls are of the same construction as described in detail in connection with motor control 301. As described in connection with the embodiment of FIG. 9, the speed pump 27' provides a motor speed-sensitive signal representative of motor speed which is applied to the signal line 76' through one of the check valves 181 or 182 with this signal being conditioned by the signal conditioner valve 28'. This signal is applied to the displacement control valve 29 and resulting positioning thereof controls the delivery of the signal to the displacement control servo cylinder 190 for positioning the swash plate 70' which can, in the embodiment of FIG. 10, move through zero displacement (zero torque) to full negative displacement (full negative torque).

The pressure regulator valve 200 has the inlet line 201 connected to the system branch line 156 whereby fluid under pressure in the system line 155 is delivered to the pressure regulator valve for establishing a minimum pressure to drive the control servo 190 and with this signal being additive to the motor speed-sensitive signal provided by the speed pump 27' because of the output of the pressure regulator valve being additive through either the line 185 or the line 210, depending on the direction of rotation of the speed pump 27'. The input to the pressure regulator valve operates on the pilot section 202a through the line 202 urging the valve in an opening direction, while the valve output acts through a line 206 to a pilot section acting to urge the valve toward a closed position. The pressure regulator valve 200 of the motor control 301 as well as the pressure regulator valves of the other controls are not subject to all of the various conditions of system pressure as described in connection with FIG. 9, with only the pilot section 202a being subject to system pressure. There is a similar connection through line 220 and branch system line 156a for the motor control 300. There is also the similar connection of system line 157 to the pilot sections 202a of the motor controls 302 and 303 as described in FIG. 9. The system line 157 has a direct line connection 310 to the line 232 connected to the inlet of the pressure regulator valve for the motor control 302 and the branch line 161 has the line 231 connecting to the inlet line 233 for the pressure regulator in the motor control 303. With this system, the system line 155 is supplying all the motors for operating in a forward direction as indicated by the legend F at the upper left of the drawing. An increase in the system pressure is applied through the system branch lines 156 and 156a to the pressure regulators for the motor controls for the motors driving the front wheels of the vehicle to increase the output of the pressure regulator valves with resulting reduction in displacement of the front drive motors. There is no action on the motor controls for the rear drive motors, since it will be noted that system branch lines 315 and 316, which extend from the system line 155 to supply the motors 150 and 151, do not have any connections to the respective motor controls. If there is an increase in system pressure in system line 157, this system pressure increase acts only on the motor controls for the motors 150 and 151 by delivery thereof through inlet lines 232 and 233 to their respective motor controls for moving the pressure regulator valves to a more open position with resulting decreased displacement of the rear drive motors.

When using hydrostatic transmissions with separate drives on the right and left side of the vehicle, it is sometimes desirable to change transmission ratio when steering the vehicle. When making a turn, the torque requirement for the drive on the side of the vehicle at the outer part of the turn is greater than that on the inside of the turn. With the system disclosed in FIG. 10, it is possible to vary the output torque from side to side of the vehicle by providing variable displacement motors. The normal speed-sensitive motor displacement control has a steering override which responds to steering signals in order to change motor displacement and motor torque in order to assist or to provide the total steer function. The steering logic works in either the forward or reverse direction.

A steer command system includes the supply pump 250 which, through the line 251, supplies fluid to the steering control valve 253 and with the maximum value of the pressure being subject to control by a relief valve 254. A steering actuator 256 is operable in response to movement of an actuator member 255, with there being a stroke feedback 257 to the control valve 253 which may be of the distance or fluid volume measuring type. When the actuator member 255 is operated to cause turn of vehicle wheels by operation of the actuator 256, the control valve 253 is operated from the neutral position shown to deliver a fluid steer signal to either of a pair of outlets connected to respective steer command signal lines 330 and 331, which extend to connections at opposite sides of the steering actuator 256. The steering actuator 256 has springs therein engageable with opposite sides of a piston whereby the control valve gives a pressure proportional to the degree of turn established by the actuator member 255. The steer command signal line 330 extends to lines 335 and 336 connected to pilot sections 262a of the pressure regulator valve 200 of the motor control 301 and of the pressure regulator valve in motor control 303. The existence of a steer command signal in the signal line 330 is indicative of a right turn whereby this signal applied to the pilot sections of the last-mentioned pressure regulator valves causes movement of those valves to a more fully open position to increase the output therefrom with resulting reduction in the displacement of the motors 151 and 17 which are driving wheels at the inside of the turn. Steer command signal line 331 connects to a line 337 which extends to a pilot section 205a of the pressure regulator valve 200 which acts in opposition to the pilot section 206a connected to the line 335. The occurrence of a steer command signal in signal line 331, indicating a left turn, acts on the pressure regulator valve 200 moving it more nearly to a closed position to reduce the output thereof with resulting increase in displacement of the motor 17 for the drive on the side of the vehicle which is on the outside of the turn. The left turn signal in command signal line 331 is also directed by a line 340 to lines 341 and 342 which act on the pilot sections 262a of the pressure regulator valves in the motor controls 300 and 302 to urge the pressure regulator valves toward a more nearly open position whereby the output of the pressure regulator valves increases to decrease the displacement of motors 16 and 150 which are on the inside of the turn. This same left turn signal in line 340 is, by a connecting line 345, delivered to the pressure regulator valve for the motor control 303 and it is applied to the pilot section 205a of the regulator valve whereby the left turn signal causes the pressure regulator valve to move more nearly toward a closed position to reduce the output with resulting increase in displacement of the motor 151, with this motor driving a wheel at the outside of the turn.

The right turn signal has previously been described as existing in signal command line 330 which, by a connecting line 350, extends to lines 351 and 352 and to pilot sections 205a of the pressure regulators of motor controls 300 and 302 which act to urge the pressure regulators toward a more nearly closed position for reduced output and increased displacement of motors 16 and 150 which provide the traction drive at the outside of the vehicle turn.

The value of the steer signals in either of the signal command lines 330 or 331 is established to be in proportion to the degree of vehicle turn. Turns, either in forward or reverse direction, require a pressure in the signal command lines, with even sharper turns requiring a further increase in the signal pressure. The disclosure of the steer command system is only illustrative of a system wherein the pressure in either of the steer signal lines 330 or 331 indicates the amount of turn. Although four motors have been shown for driving four individual wheels, it will be obvious that only the motors 16 and 17 could be used in a tracked vehicle for driving tracks at opposite sides of the vehicle. It is known in such a drive system to use a steering control which is a pressure modifier or pressure generator and such pressure generated signals could be used as steer command signals in signal lines 330 and 331.

It will be evident from the foregoing that when a right turn is signaled, the pressure in signal line 330 increases, which decreases the displacement of the motors 17 and 151 involved with the traction at the right side of the vehicle, and increases the displacement of the motors 16 and 150 involved with the traction at the left side of the vehicle. This increases left side torque and reduces right side torque which assists the geometry established by the steering actuator 256. In this manner, drive spin-outs are automatically prevented. The displacements can be adjusted so that no vehicle speed change occurs or so that the vehicle travels faster or slower.

For spin-turns, as on a tracked vehicle or skidsteer wheeled vehicles, full application of the steer signal in steer signal line 330 may cause the right side motors 17 and 151 to pass through zero displacement and to full negative displacement which causes the right side of the vehicle to move in a reverse direction as the left side of the vehicle moves in a forward direction.

For vehicles not requiring precise torque or speed control during turns, a steer signal may be applied to only the motor controls at one side of the vehicle, as for example, the steer signal in signal line 330 could be omitted from the motors at the left side of the vehicle and the steer signal in steer signal line 331 could be omitted from the control for the motors at the right side of the vehicle.

A system has been disclosed where the steer command signals are proportional to the amount of turn, however, for a less precise system this is not necessary and such signals may approach a limit signal which alters motor displacement if steer pressure arises above a set level as might happen when attempting to steer the vehicle along difficult terrain.

I claim:

1. A hydrostatic drive system for a pair of drive shafts with anti-slip drive characteristics comprising, a pair of variable displacement fluid motors associated one with each of said drive shafts, a pump in closed circuit with said motors with said motors being connected in parallel with said pump, a pair of movable displacement-setting members associated one with each motor, a pair of signal-generating means associated one with each motor and with each signal-generating means generating a variable signal which increases in value as the speed of the associated motor increases, and control devices connected one to each of said displacement-setting members and responsive to an increase in the variable signal indicating increased motor speed for reducing displacement of the associated motor with the maximum value of the variable signal achieving zero output torque.

2. A control for a variable displacement motor having a movable displacement-setting member which is movable to a position to set zero motor displacement comprising, a control device connected to said displacement-setting member and actuable by a variable signal to move the last-mentioned member toward a zero displacement-setting position, means for generating a conditioned variable signal representative of motor speed, and means responsive to a predetermined intermediate value of said variable signal for communicating said signal to said control device for reducing motor displacement.

3. A control as defined in claim 2 including means associated with said responsive means for limiting the value of said signal applied to the control device for a range of signal values above said predetermined intermediate value to provide a dwell in the reduction of motor displacement.

4. A control as defined in claim 2 wherein said variable signal is motor speed sensitive and means operable to change the relation between the signal and motor speed to establish another range of motor displacement response to motor speed.

5. A control as defined in claim 2 wherein said control is hydraulic, said control device is a displacement control cylinder, said responsive means is a displacement valve operable by said signal, and said signal-generating means includes a speed pump driven by the motor and flowconnected by a fluid line to said displacement valve, and a signal conditioner valve in a branch line extending from the fluid line to drain and having a variable orifice responsive to pressure in said branch line for establishing the relation between motor speed and displacement.

6. A control as defined in claim 5 including an override valve connected to said fluid line and movable between two positions to vary the signal applied to said displacement control cylinder and provide two different relations between motor speed and displacement.

7. A control as defined in claim 5 wherein said displacement valve is urged to a closed position to block delivery of said signal to the displacement control cylinder and is urged toward an open position by said signal.

8. A control as defined in claim 5 wherein preload means limit the movement of the displacement valve in response to a range of signal values above said predetermined intermediate value.

9. A load-compensated control for a variable displacement motor having a movable displacement-setting member which is movable to a position to set motor displacement comprising, a control device connected to said displacement-setting member and actuable by a variable signal to move the last-mentioned member toward a zero displacement-setting position, means for generating a variable signal representative of motor speed, means responsive to a predetermined value of said variable signal for communicating said signal to said control device for reducing motor displacement, and means responsive to the system pressure of fluid supplied to said motor for modifying the value of said signal.

10. A control as defined in claim 9 wherein the means for modifying the value of said signal operates to increase the value of said signal as system pressure increases above a certain value.

11. A control as defined in claim 9 wherein there are a plurality of motors usable for driving a vehicle with at least one first motor for a front drive shaft and at least one second motor for a rear drive shaft, each of said motors having signal-modifying means associated therewith, the last-mentioned means associated with said first motor being responsive to an increase of system pressure when the vehicle is accelerating to increase the value of said signal and decrease displacement of the first motor, and the last-mentioned means associated with said second motor being responsive to an increase of system pressure when the vehicle is accelerating to decrease the value of said signal and increase the displacement of the second motor.

12. A load-compensated control for each of plural variable displacement motors usable in separate drives at the front and rear of a vehicle for changing transmission ratio when system loading changes and wherein a pump is in closed fluid system with said motors, a servo control for each of said motors, a displacement control for each of said servo controls, means associated with each motor including a speed pump driven by the motor for applying a motor speed sensitive fluid signal to the associated displacement and servo control for control of the displacement of the associated motor, a plurality of pressure regulator valves associated one with each motor and having an output in a fluid circuit with said speed pump and an input connected to the closed fluid system and being piloted by said input to increase the speed sensitive signal as the input pressure increases, a first of the pressure regulator valves associated with the control for the front drive motor having said input connected to the closed fluid system in a manner whereby the input pressure increases upon forward acceleration of the front drive motor, and a second of the pressure regulator valves associated with the control for the rear drive motor has said input connected to the closed fluid system in a manner whereby the input pressure increases as the rear drive motor decelerates.

13. A control as defined in claim 12 wherein said pressure regulator valves have an additional pilot control operable in opposition to the piloting by said input with said additional pilot controls connected to the closed fluid system in a manner whereby the additional pilot control pressure for the first of said pressure regulators increases upon forward deceleration of the front drive motor, and the additional pilot control pressure for the second of said pressure regulators increases as the rear drive motor accelerates.

14. A control as defined in claim 13 wherein there are two of said front drive motors, and a steering control for said front drive motors including a pressure pilot section associated with each of the pressure regulators for the front drive motors, and means for generating a steer pressure signal applied to one of said pressure pilot sections for decreasing the displacement of one of the front drive motors as the value of the steer pressure signal controlling a turn towards the side of said motor increases.

15. A steer compensated control for a variable displacement motor having a movable displacement-setting member which is movable to a position to set motor displacement comprising, a control device connected to said displacement-setting member and actuable by a variable signal to move the last-mentioned member toward a negative displacement-setting position, means for generating a variable motor speed signal, means responsive to a predetermined value of said variable signal for communicating said signal to said control device for reducing motor displacement, and means responsive to a steer command signal for modifying the value of said variable signal.

16. A control as defined in claim 15 wherein said steer command signal is a fluid pressure signal.

17. A control as defined in claim 16 wherein said means responsive to a steer command signal includes a pressure-regulator valve having an output which is additive to said generated variable signal, and a pilot section for positioning of said pressure-regulator valve and which receives said steer command signal.

18. A control as defined in claim 17 wherein said pressure regulator valve has two of said pilot sections operable in opposition to each other to either increase or decrease the output of the pressure-regulator valve, and means for connecting either of two steer command signals one to each of said pilot sections.

19. A steer compensated control for each of plural variable displacement motors usable in separate traction drives at opposite sides of a vehicle for changing transmission ratio when steering the vehicle, a servo control for each of said motors, a displacement control for each of said servo controls, means responsive to the speed of a motor for controlling the displacement thereof, and means associated with each motor and responsive to a steer command signal for modifying the displacement of the associated motor.

20. A control as defined in claim 19 wherein said means responsive to a steer command signal includes a pressure regulator valve having an output utilized in modifying the displacement of the associated motor, and a pair of pilot sections positioned for acting in opposite directions on the pressure regulator valve, and each connected for receiving alternate ones of a pair of said steer command signals.

21. A steer compensated control for each of plural variable displacement motors usable in separate traction drives at opposite sides of a vehicle for changing transmission ratio when steering the vehicle, each of said controls comprising, a servo control for setting displacement of a motor, a displacement control for said servo controls, means for generating a motor speed-sensitive signal, and a pressure regulator valve having an output additive to said speed-sensitive signal and having a pilot section operable on the pressure-regulator valve to control the output thereof, and a steer command system including means for generating either a right turn or a left turn signal, and means connecting the steer command system to the pilot section of the pressure regulator associated with the motor for the traction drive at the right side of the vehicle to deliver the right turn signal thereto and increase the output thereof and reduce the displacement of the last-mentioned motor, and means connecting the steer command system to the pilot section of the pressure regulator associated with the motor for the traction drive at the left side of the vehicle to deliver the left turn signal thereto and increase the output thereof and reduce the displacement of the last-mentioned motor.

22. A control as defined in claim 21 wherein each of said pressure-regulator valves has a pair of said pilot sections operable in opposite directions on the pressure regulator and the connections thereof to the steer command system result in a right turn signal reducing the displacement of the motor for the traction drive at the right side of the vehicle and increasing the displacement of the motor for the traction drive at the left side of the vehicle, and a left turn signal has the opposite effect on the displacements for the two motors.

23. A control as defined in claim 22 wherein there are two motors for each of the traction drives and the steer command signals are connected to the controls for all of said motors whereby the turn signals act uniformly on the two motors of each traction drive.

24. A control as defined in claim 22 wherein the steer command system includes a control valve having right turn and left turn signal outlets, a first line connecting the right turn signal outlet to one pilot section of both pressure regulator valves to cause opposite action of said pressure regulator valves in response to a right turn signal, and a second fluid line connecting the left turn signal outlet to the others of said pilot sections to cause actions of the pressure-regulator valves in response to a left turn signal which is the reverse of that occurring in response to a right turn signal.

* * * * *